(12) United States Patent
Baran, Jr. et al.

(10) Patent No.: US 7,189,768 B2
(45) Date of Patent: Mar. 13, 2007

(54) SOLUTION CONTAINING SURFACE-MODIFIED NANOPARTICLES

(75) Inventors: Jimmie R. Baran, Jr., Prescott, WI (US); William J. Hunt, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 282 days.

(21) Appl. No.: 10/722,177

(22) Filed: Nov. 25, 2003

(65) Prior Publication Data

US 2005/0113489 A1    May 26, 2005

(51) Int. Cl.
*C08K 9/00*   (2006.01)
*B32B 9/04*   (2006.01)
*B32B 13/04*  (2006.01)
*B32B 17/06*  (2006.01)
*B32B 27/38*  (2006.01)

(52) U.S. Cl. ............... 523/200; 523/205; 523/216; 428/413; 428/426; 428/446; 428/457; 428/480; 428/688

(58) Field of Classification Search ............... 428/413, 428/426, 437.1, 437.5, 446, 457, 480, 688, 428/437; 523/200, 205, 216
See application file for complete search history.

(56) References Cited

U.S. PATENT DOCUMENTS

| | | |
|---|---|---|
| 2,801,185 A | 7/1957 | Iler |
| 4,455,205 A | 6/1984 | Olson et al. |
| 4,478,876 A | 10/1984 | Chung |
| 4,486,504 A | 12/1984 | Chung |
| 4,491,508 A | 1/1985 | Olson et al. |
| 4,522,958 A | 6/1985 | Das et al. |
| 5,037,579 A | 8/1991 | Matchett |
| 5,258,225 A | 11/1993 | Katsamberis |
| 5,433,973 A | 7/1995 | Wallack et al. |
| 5,648,407 A | 7/1997 | Goetz et al. |
| 5,672,662 A | 9/1997 | Harris et al. |
| 5,695,820 A | 12/1997 | Davis et al. |
| 5,874,503 A | 2/1999 | Scheibelhoffer et al. |
| 6,268,464 B1 | 7/2001 | Keinanen et al. |
| 6,467,897 B1 | 10/2002 | Wu et al. |
| 6,572,693 B1 | 6/2003 | Wu et al. |
| 6,586,483 B2 | 7/2003 | Kolb et al. |
| 6,649,672 B1 | 11/2003 | Ducoffre et al. |
| 6,700,708 B2 * | 3/2004 | Houlihan et al. ........... 359/618 |
| 2002/0156152 A1 | 10/2002 | Zhang et al. |
| 2003/0117476 A1 | 6/2003 | Cross et al. |
| 2003/0162874 A1 | 8/2003 | Redford et al. |
| 2005/0151119 A1 | 7/2005 | Jones et al. |

FOREIGN PATENT DOCUMENTS

| | | |
|---|---|---|
| DE | 197 25 984 C2 | 12/1998 |
| EP | 0 483 818 A2 | 5/1992 |
| EP | 1 479 734 A1 | 11/2004 |
| WO | WO 00/06495 | 2/2000 |
| WO | WO 01/30872 A1 | 5/2001 |
| WO | WO 01/74953 A1 | 10/2001 |

OTHER PUBLICATIONS

Nguyen et al., "Patterning of Small Particles by a Surfactant-Enhanced Marangoni-Benard Instability", Physical Review Letters, vol. 88, No. 16, Apr. 22, 2002, pp. 164501-1 to 164501-4.
U.S. Appl. No. 10/449,359, filed May 30, 2003, Stabilized Particle Dispersions Containing Surface-Modified Inorganic Nanoparticles.
U.S. Appl. No. 10/499,677, filed May 30, 2003, Stabilized Particle Dispersions Containing Nanoparticles.
U.S. Appl. No. 10/689,172, filed Oct. 20, 2003, Adhesive Articles Including a Nanoparticle Primer and Methods for Preparing Same.
Haw et al., "Effects of Phase Behavior on the Drying of Colloidal Suspensions", Langmuir 2002, 18, Jan. 26, 2002, pp. 1626-1633.
Mackay et al., "Influence of Dendrimer Additives on the Dewetting of Thin Polystyrene Films", Langmuir 2002, 18, Feb. 1, 2002, pp. 1877-1882.
Barnes et al., "Influence of nanoparticles and polymer branching on the dewetting of polymer films", Elsevier, Advances in Colloid and Interface Science 94 (2001), Nov. 15, 2001, pp. 83-104.
Barnes et al., "Suppression of Dewetting in Nanoparticle-filed Polymer Films", Macromolecules 2000, 33, May 3, 2000, pp. 4177-4177.
Shmuylovich et al., "Surface Morphology of Drying Latex Films: Multiple Ring Formation", Langmuir 2002, 18, Apr. 6, 2002, pp. 3441-3445.
Qu et al., "Surfactant Self-Assemblies Controlling Spontaneous Dewetting", Langmuir 2002, 18, Feb. 8, 2002, pp. 1649-1654.

* cited by examiner

*Primary Examiner*—Kriellion Sanders
(74) *Attorney, Agent, or Firm*—Thomas M. Spielbauer

(57) ABSTRACT

Coating solutions comprising surface-modified nanoparticles, a first liquid having a vapor pressure, VP1, and a second liquid miscible with the first liquid, having a vapor pressure, VP2, that is less than VP1, wherein the nanoparticles are more compatible with the first liquid than with the second liquid, are provided. Methods of applying and drying these solutions, and articles comprising substrates coated with these solutions are also provided.

21 Claims, 6 Drawing Sheets

SOLUTION CONTAINING SURFACE-MODIFIED NANOPARTICLES

BACKGROUND

The present invention relates to coating solutions comprising surface-modified nanoparticles.

A wide variety of products are produced by coating a solution onto a substrate. These solutions comprise at least one material that is a liquid at the coating conditions and, optionally, one or more materials that are solid at the coating conditions. Common liquid materials include, e.g., solvents (e.g., water, organic solvents and inorganic solvents) and syrups (e.g., monomers, oligomers, and polymers). Common solid materials include, e.g., resins (e.g., polymers), and fillers (e.g., particles and fibers). In some applications, a subsequent drying step is used to evaporate at least a portion of one or more of the liquid materials, allowing the solid materials to form a film on the coated surface of the substrate. Additionally, or alternatively, one or more of the liquid materials can be solidified by, e.g., curing and/or crosslinking to aid in the formation of a film.

Generally, it is desirable to produce a film that is uniform over the substrate, e.g., a film that is flat and level. In order to minimize film variations (e.g., film thickness), it is desirable to minimize defects. Defects may be generated during both the coating and drying operations. A wide variety of factors affect the formation of defects including: application method (e.g., roll coating, knife coating, and spray coating); drying method (e.g., forced-air and radiant energy); process conditions (e.g., line speed, temperature gradients, and coating thickness); coating composition; and coating properties (e.g., density, surface tension, viscosity, and solids content).

Efforts to reduce defects have included adding a surfactant to the coating solution, adjusting the solids content of the coating solution, and using less extreme drying conditions. Each of these approaches has drawbacks. The addition of a surfactant may compromise overcoating potential or interlayer adhesion, and introduce a species that may migrate through the dried coating layer. Alterations to the solids content may limit the window of operation for the coating process (i.e., the optimum solids content to minimize defects generated during drying may be very different than the optimum solids content for the desired coating operation). Less extreme drying conditions generally require reductions in line speed, which may impact the coating operation and increase production costs.

SUMMARY

Briefly, in one aspect, the present invention provides a coating solution comprising surface-modified nanoparticles, a first liquid having a vapor pressure, VP1, and a second liquid miscible with the first liquid, having a vapor pressure, VP2, that is less than VP1, wherein the nanoparticles are more compatible with the first liquid than with the second liquid.

In some embodiments, the second liquid is curable by e.g., heat, actinic radiation, electron beam radiation, moisture, or combinations thereof. In some embodiments, the second liquid is selected from the group consisting of: acrylates, methacrylates, epoxies, polyesters, polyols, isocyanates, polystyrene, polyacrylates, polymethacrylates, vinyl ethers, polyurethane, and combinations thereof.

In some embodiments, the first liquid and/or the second liquid is selected from the group consisting of: water, organic solvents (e.g., alcohols, ketones, toluene, and combinations thereof), inorganic solvents, and combinations thereof. In some embodiments, the second liquid is 1-methoxy-2-propanol acetate.

In some embodiments, the coating solution further comprises a material selected from the group consisting of dyes, pigments, fillers, electrically conductive materials, thermally conductive materials, fibers, film-forming polymers (e.g., polymethylmethacrylate), clays, silicas, antioxidants, catalysts, initiators, microspheres (e.g., ceramic or polymeric microspheres), and combinations thereof.

In another aspect, the present invention provides a method of enhancing coating uniformity comprising applying a coating solution to the surface of a substrate, wherein the coating solution comprises surface-modified nanoparticles, a first liquid having a vapor pressure, VP1, and a second liquid miscible with the first liquid, having a vapor pressure, VP2, that is less than VP1, wherein the nanoparticles are more compatible with the first liquid than with the second liquid, and removing at least a portion of the first liquid.

In some embodiments, the first liquid is removed by evaporation.

In another aspect, the present invention provides a method of enhancing coating uniformity comprising applying a coating solution to the surface of a substrate, wherein the coating solution comprises surface-modified nanoparticles, a first liquid having a vapor pressure, VP1, and a second liquid miscible with the first liquid, having a vapor pressure, VP2, that is less than VP1, wherein the nanoparticles are more compatible with the first liquid than with the second liquid, and removing at least a portion of the first liquid and removing at least a portion of the second liquid.

In another aspect, the present invention provides a method of enhancing coating uniformity comprising applying a coating solution to the surface of a substrate, wherein the coating solution comprises surface-modified nanoparticles, a first liquid having a vapor pressure, VP1, and a second liquid miscible with the first liquid, having a vapor pressure, VP2, that is less than VP1, wherein the nanoparticles are more compatible with the first liquid than with the second liquid, and removing at least a portion of the first liquid and curing the second liquid.

In yet another aspect, the present invention provides a coated substrate comprising a substrate having a surface, and a coating solution applied to that surface, wherein the coating solution comprises surface-modified nanoparticles, a first liquid having a vapor pressure, VP1, and a second liquid miscible with the first liquid, having a vapor pressure, VP2, that is less than VP1, wherein the nanoparticles are more compatible with the first liquid than with the second liquid, and wherein at least a portion of the first liquid has been removed.

In another aspect, the present invention provides a coated substrate comprising a substrate having a surface, and coating solution applied to that surface, wherein the coating solution comprises surface-modified nanoparticles, a first liquid having a vapor pressure, VP1, and a second liquid miscible with the first liquid, having a vapor pressure, VP2, that is less than VP1, wherein the nanoparticles are more compatible with the first liquid than with the second liquid, wherein at least a portion of the first liquid has been removed, and wherein the second liquid has been cured.

In some embodiments, the coated substrate is selected from the group consisting of: glass, metal, polymer, ceramic, paper, wood, fabric, and combinations thereof.

In some embodiments, the present invention enables greater control over the surface topography of dried films. In some embodiments, the present invention enables the use of more rigorous drying conditions and permits increased line speeds. In some embodiments, the present invention enables the use of thicker wet films during the coating operation without the development of drying defects such as mottle.

The details of one or more embodiments of the invention are set forth in the description below. Other features, objects, and advantages of the invention will be apparent from the description and from the claims.

DETAILED DESCRIPTION

Figure 1:
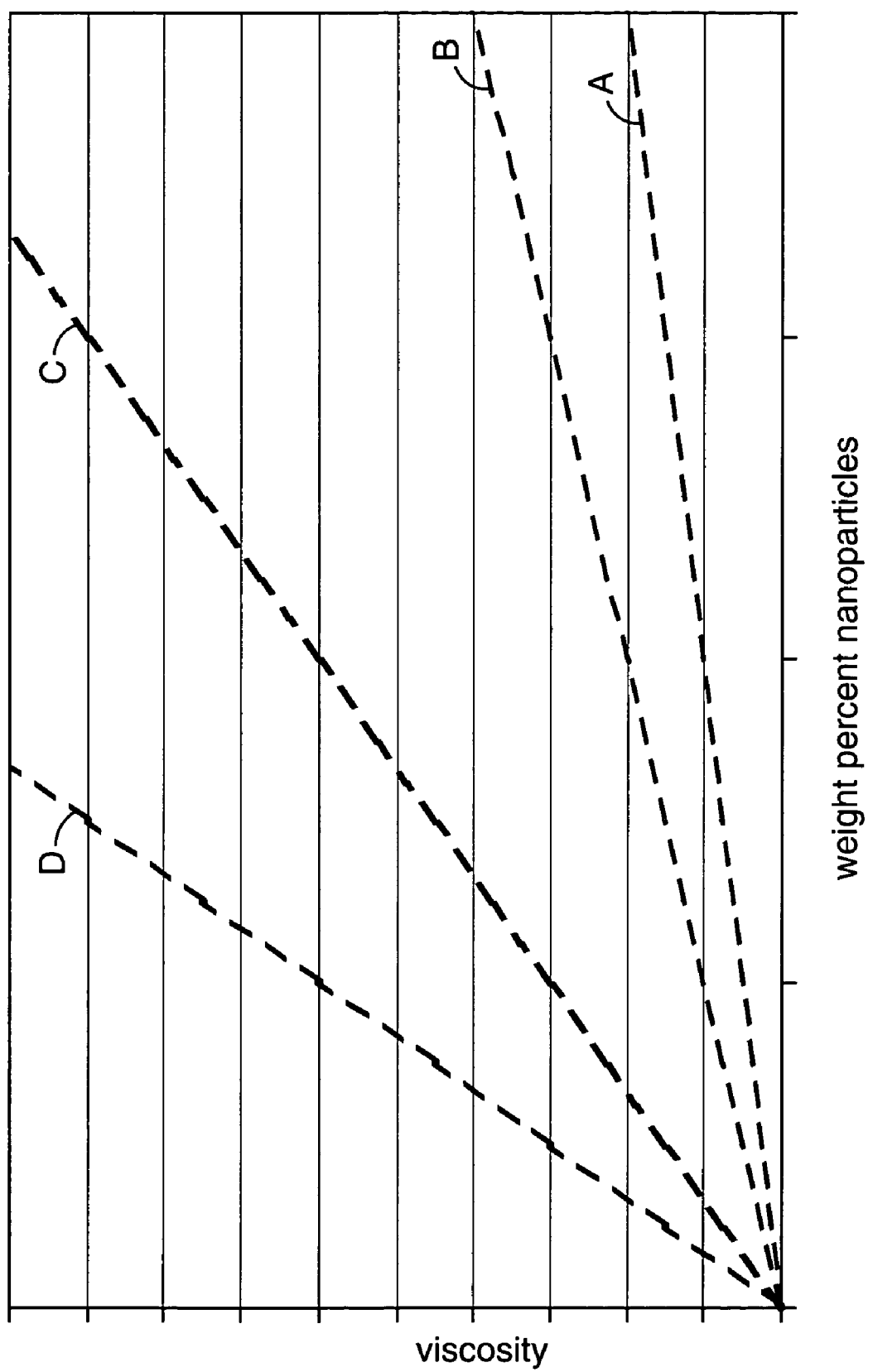
FIG. 1 shows an idealized chart of viscosity versus weight percent of nanoparticles in various liquids, from which the relative compatibility of surface modified nanoparticles may be determined.

The present inventors have discovered that the addition of surface-modified nanoparticles to a coating solution can inhibit defect formation without adversely impacting the coating and drying processes. The nanoparticles may be organic nanoparticles, inorganic nanoparticles, or a combination thereof.

The coating solutions of the present invention comprise at least two liquid materials, and, after the coating solution has been applied to a substrate, at least one of the liquid materials is substantially removed by, e.g., evaporation. The liquid materials disperse the nanoparticles and aid in handling and applying (e.g., coating) the solution. In some embodiments, more than one of the liquid materials is removed, e.g., evaporated, after the coating solution has been applied to a substrate. In some embodiments, at least one liquid material is solidified (e.g., cured and/or crosslinked) after the coating solution has been applied to a substrate.

Liquid materials that are removed after coating generally have a vapor pressure at the drying conditions (e.g., temperature, pressure, and vapor phase composition) sufficient to evaporate the liquid. In some embodiments, at least about 80 percent by weight of the liquid (e.g., at least about 90%, or at least about 95%) is removed during drying. In some embodiments, substantially all of the liquid is removed during drying, i.e., at least about 98 percent by weight (e.g., at least about 99%) of the liquid is removed.

Generally, a liquid having a higher vapor pressure at the drying conditions will be removed preferentially relative to a liquid having a lower vapor pressure. In some embodiments, more than one liquid will be removed simultaneously; however, the liquid with the higher vapor pressure will be removed at a higher rate relative to the liquid with the lower vapor pressure. In some embodiments, some portion of a second liquid will remain present in the coating solution after substantially all of a first liquid has been removed. The slowest evaporating (i.e., lowest vapor pressure) liquid is called the "tail solvent." Generally, at least a portion of the tail solvent remains in the coating solution after substantially all of the other liquids that will be removed have been removed.

Suitable removable liquids include, e.g., organic solvents, inorganic solvents, and combinations thereof. Suitable organic solvents include, e.g., aliphatic, alicyclic, and aromatic solvents, including, e.g., hydrocarbons (e.g., toluene), alcohols, ketones, aldehydes, amines, amides, esters, glycols, ethers, halocarbons, alkyl and aryl nitro compounds, partially or fully fluorinated compounds, and combinations thereof. Suitable inorganic solvents include, e.g., water, carbon dioxide, carbon disulfide, and combinations thereof.

Liquids solidified after coating include, e.g., monomers, oligomers, polymers, or combination thereof. In some embodiments, these liquids may be cured with, e.g., heat, actinic radiation, electron beam, moisture, or combinations thereof. In some embodiments, these liquids may be crosslinkable. In some embodiments, the solidified liquid may be a paint, e.g., a lacquer.

Examples of suitable organic nanoparticles include buckminsterfullerenes (fullerenes), dendrimers, organic polymeric nanospheres, aminoacids, and linear or branched or hyperbranched "star" polymers such as 4, 6, or 8 armed polyethylene oxide (available, e.g., from Aldrich Chemical Company, Milwaukee, Wis.; or Shearwater Corporation, Huntsville, Ala.) with a variety of end groups, and combinations thereof. Further examples of suitable organic nanoparticles include those described in U.S. application Ser. No. 10/449,677 (filed on May 30, 2003). Examples of suitable organic nanoparticles also include combined materials such as a mixture of materials or layers of materials surrounding a central organic core.

Specific examples of fullerenes include $C_{60}$, $C_{70}$, $C_{82}$, and $C_{84}$. Specific examples of dendrimers include polyamidoamine (PAMAM) dendrimers of Generations 2 through 10 (G2–G10), available from, e.g., Aldrich Chemical Company, Milwaukee, Wis.

Specific examples of useful organic polymeric nanospheres include nanospheres that comprise polystyrene, available from Bangs Laboratories, Inc., Fishers, Ind., as powders or dispersions. Average particle sizes of the polystyrene nanospheres range from at least 20 nanometers (nm) to not more than 60 nm. Current commercially available average particle sizes include 20, 30, 50, and 60 nm.

Examples of suitable inorganic nanoparticles include, but are not limited to, calcium phosphate (e.g., hydroxy-apatite), clays, metal oxides, silica, zirconia, titania, ceria, alumina, iron oxide, vanadia, antimony oxide, tin oxide, alumina/silica, and any combinations thereof. Further examples of suitable inorganic nanoparticles include those described in U.S. application Ser. No. 10/449,359 (filed on May 30, 2003). Examples of suitable inorganic nanoparticles also include combined materials such as a mixture of materials or layers of materials surrounding a central inorganic core.

The nanoparticles may be in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.

Useful metal oxide colloidal dispersions include colloidal zirconium oxide, suitable examples of which are described in U.S. Pat. No. 5,037,579; and colloidal titanium oxide, useful examples of which are described in PCT Publication No. WO 00/06495, entitled, "Nanosize Metal Oxide Particles for Producing Transparent Metal Oxide Colloids and Ceramers," (Arney et al.), filed Jul. 30, 1998.

The surface-modified nanoparticles are desirably individual, unassociated (i.e., non-aggregated) nanoparticles dispersed throughout the solution. Desirably, the surface-modified nanoparticles do not irreversibly associate with each other prior to the application of the solution to a substrate and the initiation of the removal of any liquids present in the solution. The terms "associate with" and "associating with" include, e.g., covalent bonding, hydrogen bonding, electrostatic attraction, London forces, and hydrophobic interactions. The surface-modified nanoparticles are selected such that the solution formed therewith is free from a degree of particle agglomeration or aggregation that would interfere with the desired properties of the solution.

The surface-modified nanoparticles have surface groups that modify the "solubility" or "wettability" characteristics of the nanoparticles. In some embodiments, the surface groups are selected to render the particles more compatible with one or more of the liquid materials in the solution. In some embodiments, the surface groups are selected to render the particles less compatible with one or more of the liquid materials in the solution.

One method of assessing the compatibility of surface-modified nanoparticles with liquid materials is to measure the viscosity of a mixture of the liquid with increasing amounts (percent by weight) of nanoparticles. A chart can be prepared comparing the viscosity increase with an increase in the weight percent of nanoparticles for various liquids. A liquid having a lower rate of viscosity build is more compatible with the nanoparticles than a liquid having a higher rate of viscosity build. By altering the surface-modifying groups, the relative compatibility with various liquids can be adjusted.

If the nanoparticles are not compatible with, or have very low compatibility with a particular liquid, they will not be sufficiently wet by that liquid and they will aggregate and separate out of the liquid. In such cases, meaningful viscosity build data generally cannot be obtained. For example, hydrophobically surface-modified nanoparticles are expected to have very low, or no compatibility with polar solvents (e.g., water and/or alcohols). The compatibility of the nanoparticles with such liquids would be ranked lower than the compatibility with the liquid showing the highest rate of viscosity build.

Figure 5:
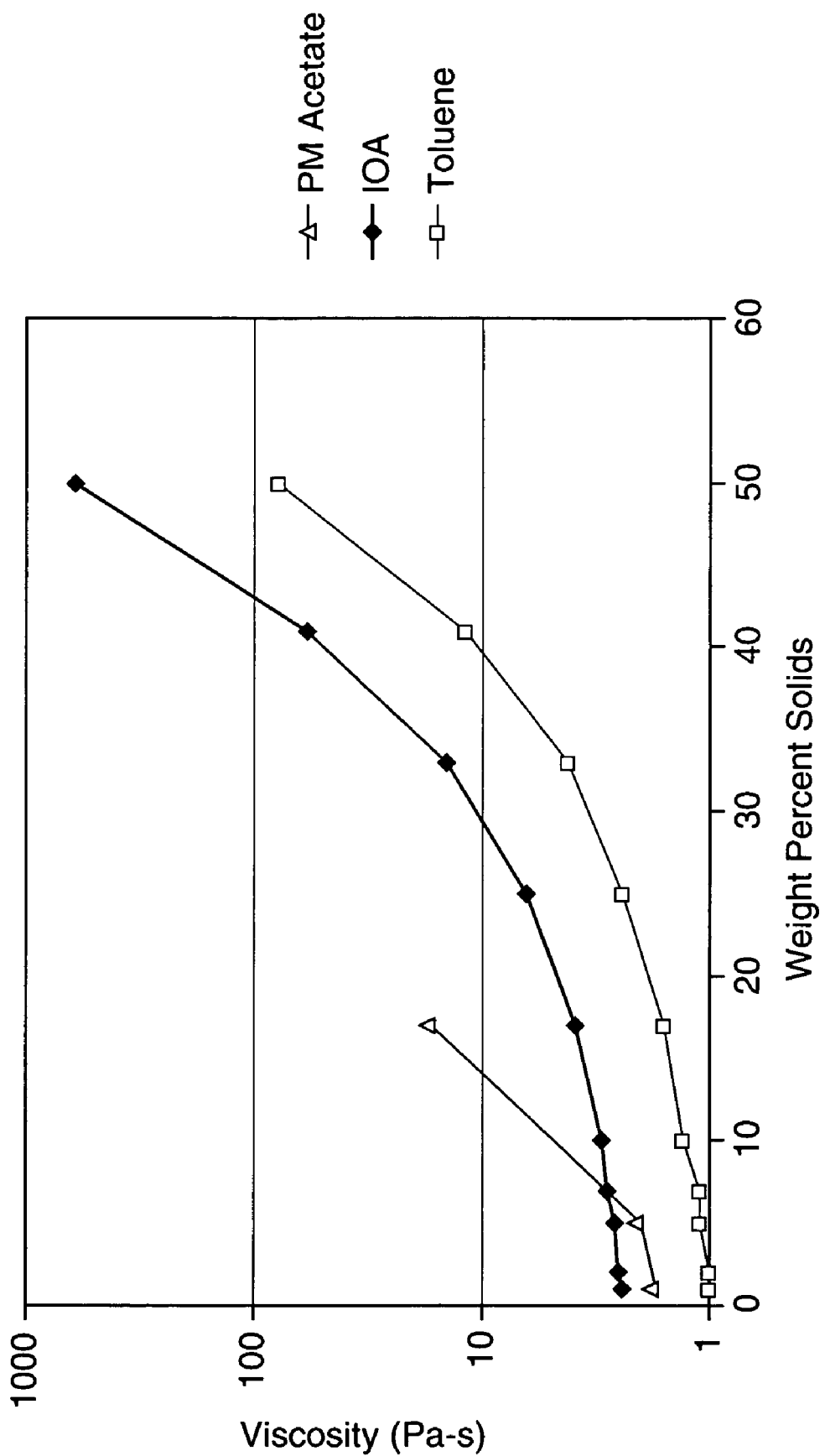
FIG. 5 is a plot of solution viscosity versus weight percent of nanoparticles for toluene, isooctyl acrylate (IOA), and 1-methoxy-2-propanol acetate (PM acetate).

An idealized chart showing the relative viscosity build for various hypothetical liquids (A, B, C, and D) with increasing amounts of a surface-modified nanoparticle is shown in FIG. 1. The lower the viscosity build (i.e., the lower the slope), the greater the compatibility of the nanoparticles with the liquid. Thus, e.g., the nanoparticles are most compatible with liquid A, and least compatible with liquid D. Viscosity build data for surface-modified nanoparticles in toluene, isooctyl acrylate, and PM acetate are shown in FIG. 5.

Desirable nanoparticles are selected such that they do not settle out of the solution, i.e., the nanoparticles remain suspended for a useful period of time. A useful period of time may be minutes, hours, days, weeks, or years, depending upon the application.

Generally, the organic or inorganic unmodified nanoparticles are chosen to be insoluble in the liquid materials; thus, the nanoparticles will disperse but not dissolve. The surface modification of the nanoparticles will allow them to be compatible with the liquid materials so that they can completely disperse.

Suitable surface groups can be selected based upon the solubility parameters of the surface group and one or more of the liquids in the coating solution. Preferably, the surface group, or the agent from which the surface group is derived, has a solubility parameter similar to the solubility parameter of at least one liquid material. When the liquid is hydrophobic (e.g., toluene, ketones, and acrylates, e.g., isooctyl acrylate (IOA), 2-ethylhexyl acrylate, and 1,6-hexanediol diacrylate (HDDA)), one skilled in the art can select from among various hydrophobic surface groups to achieve a surface-modified particle that is compatible with the hydrophobic liquid. Similarly, when the liquid material is hydrophilic (e.g., water, alcohols, e.g., methanol and ethanol, and combinations thereof), one skilled in the art can select from hydrophilic surface groups, and, when the liquid material is a hydrofluorocarbon, one skilled in the art can select from among various compatible surface groups. The nanoparticle can also include at least two different surface groups that combine to provide a nanoparticle having a solubility parameter that is similar to the solubility parameter of a liquid. The surface groups may be selected to provide a statistically averaged, randomly surface-modified particle. The surface-modified nanoparticles are not amphiphilic.

The surface groups are present on the surface of the particle in an amount sufficient to provide surface-modified nanoparticles that are capable of being subsequently dispersed in the liquid material(s) of the coating solution without aggregation. In some embodiments, the surface groups are present in an amount sufficient to form a monolayer, preferably a continuous monolayer, on the surface of the nanoparticle. In some embodiments, the surface groups are present in an amount less than that required to form a monolayer.

Surface-modifying groups may be derived from surface-modifying agents. Surface-modifying agents contain group (s) capable of attaching to the surface of the nanoparticle, and compatibilizing group(s) that may be reactive or non-reactive with a liquid material of the coating solution. In some embodiments, the compatibilizing groups can be selected to render the particle relatively more polar, relatively less polar, or relatively non-polar.

Suitable classes of surface-modifying agents include, e.g., silanes, organic acids organic bases, alcohols, and combinations thereof.

Particularly useful surface-modifying agents include silanes. Examples of useful silanes include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris(isobutoxy)silane, vinyltris(isopropenoxy)silane, and vinyltris(2-methoxyethoxy)silane; trialkoxyarylsilanes; isooctyltrimethoxy-silane; N-(3-triethoxysilylpropyl) methoxyethoxyethoxy ethyl carbamate; N-(3-triethoxysilylpropyl) methoxyethoxyethoxyethyl carbamate; silane functional (meth)acrylates including, e.g., 3-(methacryloyloxy) propyltrimethoxysilane, 3-acryloyloxypropyltrimethoxysilane, 3-(methacryloyloxy) propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)methyltriethoxysilane, 3-(methacryloyloxy)methyltrimethoxysilane, 3-(methacryloyloxy)propyldimethylethoxysilane, 3-(methacryloyloxy)propenyltrimethoxysilane, and 3-(methacryloyloxy)propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Methods of surface modifying silica using silane functional (meth)acrylates are described, e.g., in U.S. Pat. Nos. 4,491,508; 4,455,205; 4,478,876; 4,486,504; and 5,258,225. The term "(meth)acrylate" includes both acrylates and methacrylates.

Useful organic acid surface-modifying agents include, e.g., oxyacids of carbon (e.g., carboxylic acid), sulfur, and phosphorus, and combinations thereof.

Representative examples of polar surface-modifying agents having carboxylic acid functionality include $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA), acid functionalized polyethylene glycols such as mono(polyethylene glycol) succinate in either acid or salt forms, and polyethylene glycols mono substituted with acetic, propionic, or butanoic acids. Such polymers or their derivatives may be prepared for example, as described in U.S. Pat. No. 5,672,662.

Representative examples of non-polar surface-modifying agents having carboxylic acid functionality include octanoic acid, dodecanoic acid, and oleic acid.

Examples of suitable phosphorus containing acids include phosphonic acids including, e.g., octylphosphonic acid, laurylphosphonic acid, decylphosphonic acid, dodecylphosphonic acid, octadecylphosphonic acid, monopolyethylene glycol phosphonate in either acid or salt forms, and phosphate or phosphonic substituted polyethylene glycols.

Useful organic base surface-modifying agents include, e.g., alkylamines including, e.g., octylamine, decylamine, dodecylamine, octadecylamine, and amine functionalized polyethylene glycols.

Examples of other useful non-silane surface-modifying agents include acrylic acid, methacrylic acid, beta-carboxyethyl acrylate, mono-2-(methacryloyloxyethyl) succinate, and combinations thereof. A useful surface-modifying agent that imparts both polar character and reactivity to the nanoparticles is mono(methacryloyloxypolyethyleneglycol) succinate.

Examples of suitable surface-modifying alcohols include, e.g., aliphatic alcohols including, e.g., octadecyl, dodecyl, lauryl, and furfuryl alcohol; alicyclic alcohols including, e.g., cyclohexanol; and aromatic alcohols including, e.g., phenol and benzyl alcohol, polyethylene glycols, monomethyl polyethylene glycols, and combinations thereof.

When the coating solution includes aromatic ring containing epoxy resins, useful surface-modifying groups can include an aromatic ring. Examples of surface-modifying groups particularly suitable for epoxy resin compositions are disclosed in U.S. Pat. No. 5,648,407.

Additional surface modifying groups are described in, e.g., U.S. application Ser. Nos. 10/449,677, and 10/449,359 (both of which were filed on May 30, 2003).

Useful surface-modifying groups for fullerenes and PAMAM dendrimers include, e.g., straight or branched alkyl groups and may range from at least $C_3$ to not greater than $C_{30}$ and may be any size or range in between $C_3$ and $C_{30}$.

Useful surface-modified zirconia nanoparticles include a combination of oleic acid and acrylic acid adsorbed onto the surface of the particle.

Useful surface-modified silica nanoparticles include silica nanoparticles surface-modified with silane surface-modifying agents including, e.g., acryloyloxypropyl trimethoxysilane, 3-methacryloyloxypropyltrimethoxysilane, 3-mercaptopropyltrimethoxysilane, n-octyltrimethoxysilane, isooctyltrimethoxysilane, and combinations thereof. Silica nanoparticles can be treated with a number of surface-modifying agents including, e.g., alcohol, organosilane including, e.g., alkyltrichlorosilanes, trialkoxyarylsilanes, trialkoxy(alkyl)silanes, and combinations thereof and organotitanates and mixtures thereof.

A variety of methods are available for modifying the surface of nanoparticles including, e.g., adding a surface-modifying agent to nanoparticles (e.g., in the form of a powder or a colloidal dispersion) and allowing the surface-modifying agent to react with the nanoparticles. One skilled in the art will recognize that multiple synthetic sequences to bring the nanoparticle together with the compatibilizing group are possible and are envisioned within the scope of the present invention. For example, the reactive group/linker may be reacted with the nanoparticle followed by reaction with the compatibilizing group. Alternatively, the reactive group/linker may be reacted with the compatibilizing group followed by reaction with the nanoparticle. Other useful surface modification processes are described in, e.g., U.S. Pat. Nos. 2,801,185 and 4,522,958.

In some embodiments, the nanoparticles, whether surface-modified or not, have an average particle diameter less than about 500 nm (e.g., less than about 400 nm, or less than about 200 nm, or less than about 100 nm); in other embodiments, the average diameter of the nanoparticles is no greater than about 80, 50, 40, 30, 20, 15, 10, 5, or 1 nm. In some embodiments, the average diameter of the nanoparticles is from about 1 nm to about 80 nm (e.g., about 1 nm to about 50 nm; or from about 1 nm to about 20 nm). If the nanoparticles are aggregated, the maximum cross-sectional dimension of the aggregated particle is subject to the above-defined limitations on the average diameter of an unaggregated nanoparticle.

The dimensions of the nanoparticles referred to herein, are the dimensions of the nanoparticles or agglomerates of nanoparticles in the bulk coating solution. After the coating solution has been applied to a surface (e.g., by coating the solution onto a substrate), the nanoparticles may agglomerate, thus forming larger structures.

The nanoparticles are employed in the solutions of the invention in an effective amount to minimize defect formation. In some embodiments, the nanoparticles are present in an amount greater than about 0.005 percent by weight (wt. %) (e.g., greater than about 0.05 wt. %, or greater than about 0.1 wt. %, or greater than about 0.2 wt. %) based on the dried weight of the coating. The amount of nanoparticles employed is generally selected to minimize the impact on the coating process. In some embodiments, the nanoparticles are present in an amount less than about 80 wt. % (e.g., less than about 60 wt. %, or less than about 50 wt. %, or less than about 25 wt. %, or less than about 10 wt. %). In some embodiments, the nanoparticles are present in any amount or range between about 0.005 and 10 wt. % (e.g., between about 0.05 and 5 wt. %). In some embodiments, the nanoparticles are present in any amount or range between about 30 and 80 wt. % (e.g., between about 40 and 75 wt. %). One skilled in the art will recognize that the effective amount required will depend upon the liquid materials present in the solution, the surface functionality and particle size of the nanoparticles, and the presence of other elements (e.g., solid materials) in the coating solution.

The coating solutions of the present invention are selected to achieve the desired relationship of relative compatibility and vapor pressure. If the coating solution comprises a first liquid that is removed and a second liquid that is solidified to aid in forming the film, then the surface-modified nanoparticles should be more compatible with the first liquid than with the second liquid.

If more than one liquid is to be removed (e.g., evaporated) from the coated solution, the compatibility of the nanoparticles with the tail solvent (i.e., the lowest vapor pressure liquid) should be less than the compatibility of the nanoparticles with the higher vapor pressure liquid(s). For example, a coating solution may comprise a first liquid, a second liquid, and a solid material, wherein the first and second liquids are evaporated to leave a film formed by the solid material. In such a coating solution, if the vapor pressure of the first liquid (VP1) is greater than the vapor pressure of the second liquid (VP2), then the compatibility of the nanoparticles with the first liquid should be greater than the compatibility of the nanoparticles with the second liquid.

Vapor pressure data for a wide variety of liquids is readily available, e.g., Handbook of Vapor Pressure, Yaws, Carl L., Gulf Publishing Company, Houston, Tex. (1994); and Vapor Pressure of Organic Compounds, Jordan, T. Earl, Interscience Publishers, Inc., New York, N.Y. (1954). Vapor pressure may also be determined using ASTM E 1194-01 "Standard Test Method for Vapor Pressure" (Vol. 11.05, ASTM Standards 2003, pages 450–456).

Table 1 shows the relative compatibility and relative vapor pressures for the hypothetical liquids of FIG. 1. A lower number indicates a liquid with greater compatibility with the nanoparticles. A lower number indicates a liquid with a higher vapor pressure. Thus, the surface-modified nanoparticles are most compatible with liquid A, and least compatible with liquid D. Similarly, liquid D has the highest vapor pressure, while liquid C has the lowest vapor pressure.

Referring to Table 1, the combination of liquids A and B would be acceptable for the present invention, as liquid A has both a greater compatibility with the nanoparticles than liquid B, and a higher vapor pressure than liquid B. Similarly, the combinations of liquids A and C, and liquids B and C could be used. The combination of liquids A and D would not be acceptable. Although A has a greater compatibility with the nanoparticles than liquid D, the vapor pressure of liquid A is less than the vapor pressure of liquid D. Similarly, the combinations of B with D and C with D would not be acceptable.

Combinations of three or more solvents are also possible. For example, the combination of A, B, and C would be acceptable, as the lowest vapor pressure liquid (i.e., C) is also the liquid having the least compatibility with the nanoparticles.

TABLE 1

| Liquid | Relative Compatibility | Relative Vapor Pressure |
|---|---|---|
| A | 1 | 2 |
| B | 2 | 3 |
| C | 3 | 4 |
| D | 4 | 1 |

Generally, the coating solutions of the present invention may also comprise materials that are solids at the coating conditions. These materials may include, e.g., organic and inorganic fillers (e.g., particles and fibers), clays, silicas, antioxidants, microspheres (e.g., glass and polymeric microspheres), dyes, pigments, thermally and/or electrically conductive materials, antistatic agents, resins, polymers, and combinations thereof. Suitable polymeric materials include, e.g., (meth)acrylates, poly(meth)acrylates, epoxies, polyesters, polyols, isocyanates, polystyrene, polyurethanes, and combinations thereof.

In some embodiments, the solution comprises other additives, including for example, curing agents, initiators, accelerators, crosslinking agents, surface active agents, and combinations thereof. In some embodiments, the solution comprises surface active agents in concentrations less than their critical micelle concentrations in that solution. In some embodiments, the coating solution comprises less than about 1 wt. % (e.g., less than 0.5 wt. %, or less than about 0.1 wt. %) surface active agents. In some embodiments, the coating solution is substantially free of surface active agents, containing, e.g., less than about 0.05 wt. % (e.g., less than about 0.005 wt. %, or less than about 0.001 wt. %), or even no surface active agents.

The solutions of the present invention may be used to form coated substrates. In some embodiments, the solution may be prepared by, for example, mixing or blending the at least two liquids, the surface-modified nanoparticles, and any optional materials. Any known mixing and/or blending equipment or techniques, including e.g., stirring, shaking, high-shear and low-shear mixing, may be used. In some embodiments, the coating solution appears homogeneous after mixing.

In some embodiments, the solution may then be applied to the surface of a substrate using any coating method known in the art (e.g., roll coating, curtain coating, bar coating, spraying, and the like.) At least one liquid is removed from the coated solution and a film is formed on the surface of the substrate. In some embodiments, the liquid is removed by evaporation. In some embodiments, one or more of the remaining coated materials may be cured by, e.g., heat, actinic radiation (e.g., infrared, visible, or ultraviolet light, and combinations thereof), electron beam, moisture, and combinations thereof.

The substrate may be any substrate upon which a coating is desired, including, e.g., glass, metal, ceramic, polymeric substrates (e.g., polymeric films), paper, wood, fabric, and the like.

The following specific, but non-limiting, examples will serve to illustrate the invention. In these examples, all percentages are parts by weight unless otherwise indicated.

EXAMPLES

Test Methods

Surface Topography—Method I

The sample to be tested was sputtered with gold/palladium (Au/Pd) to enhance contrast. At least two areas of 2.0 millimeters (mm) by 2.5 mm were measured using a WYKO NT-3300 optical interferometer (obtained from Wyko, Tucson, Ariz.). The resulting images were filtered to remove tilt. The following surface topography numbers were calculated from the data obtained:

Ra (nanometers (nm))—roughness average

Rq (nm—root mean square roughness

Smaller values are indicative of flatter and more uniform surfaces.

Surface Topography—Method II

The sample to be tested was sputtered with gold/palladium (Au/Pd) to enhance contrast. Four areas of 2.4 mm by 1.9 mm were measured in VSI mode using a WYKO NT3000 optical interferometer (obtained from Wyko, Tucson, Ariz.). The resulting images were filtered to remove tilt. The following surface topography numbers were calculated from the data obtained:

Ra (nm)—roughness average

Rq (nm)—root mean square roughness

Materials

TABLE 2

| Component | Description | Source |
|---|---|---|
| IOTMS | isooctyltrimethoxysilane | Gelest, Tullytown, Pennsylvania |
| SILQUEST A174 | 3-(trimethoxysilylpropyl) methacrylate tris(2methoxyethoxy) vinylsilane 3-(triethoxysilyl) propylisocyanate | OSi Specialties Inc., Endicott, New York Sigma-Aldrich Chemical Co., Milwaukee, Wisconsin |
| IOA | isooctylacrylate | |
| MOP | 1-methoxy-2-propanol | Sigma-Aldrich |
| Toluene | toluene | Sigma-Aldrich |
| THF | tetrahydrofuran | |
| MEK | methyl ethyl ketone | |
| PM Acetate | 1-methoxy-2-propanol acetate | Sigma-Aldrich |
| DIGLYME | diethylene glycol methyl ether | |
| HDDA | 1,6-hexanediol diacrylate | Sartomer, Exton, Pennsylvania |
| PROSTAB 5198 | 4-hydroxy-2,2, 6,6-tetramethyl-1-piperidinyloxy (hindered amine nitroxide) | Ciba Specialty Chemicals, Tarrytown, New York |
| PMMA | polymethylmethacrylate, approximately 120,000 molecular weight. | Sigma-Aldrich |
| DAROCUR 1173 | 2-hydroxy-2-methyl-1-phenyl-1-propanone | Ciba Specialty Chemicals |
| DBTDL | dibutyltin dilaurate | |
| NALCO 2326 | 5 nanometer (nm) ammonium-stabilized colloidal silica, 15% solids. | Ondeo Nalco Chemical Co., Bedford Park, Illinois |
| NALCO 2327 | 20 nanometer (nm) ammonium-stabilized colloidal silica, 40% solids. | Ondeo Nalco Chemical Co. |

Surface Modification of Silica Nanoparticles

Surface modified silica nanoparticles in which the particle surfaces were hydrophobically modified using trialkoxysilane coupling agents were prepared as follows:

SILICA-A

Two hundred fifty grams (g) of NALCO 2326 were weighed into a 500-milliliter (mL) round-bottom, 3-neck flask, equipped with a mechanical stirrer and a reflux condenser. A solution of 15.36 g IOTMS and 281.25 g MOP was prepared separately in a beaker.

The IOTMS/MOP solution was added to the flask containing NALCO 2326 via an open port while the NALCO 2326 sol was stirred. The beaker was then rinsed with an additional 34.4 g MOP, which was subsequently added to the stirred mixture. After complete addition, the open port in the flask was stoppered and the flask was placed in an oil bath. The oil bath was then heated to 80° C. and the reaction was allowed to proceed for about 16 hours. The resultant sol was dried in a flow-through oven at 150° C. to recover the surface modified nanoparticles (SILICA-A).

SILICA-B

Two hundred fifty g of NALCO 2326 were weighed into a 500 mL round-bottom, 3-neck flask, equipped with a mechanical stirrer and a reflux condenser. A solution of 21.76 g IOTMS and 281.25 g MOP was prepared separately in a beaker. The IOTMS/MOP solution was added into the flask via an open port while the NALCO 2326 sol was stirred. The beaker was then rinsed with an additional 45.5 g MOP, which was subsequently added to the stirred mixture. After complete addition, the open port in the flask was stoppered and the flask was placed in an oil bath. The oil bath was then heated to 80° C. and the reaction was allowed to proceed for about 16 hours. The sol was dried in a flow through oven at 150° C. to recover the surface modified particles (SILICA-B).

SILICA-C

N-(3-triethoxysilylpropyl) methoxyethoxyethyl carbamate (PEG2TES) was prepared as follows: 35 g DIGLYME and 77 g MEK were added to a 250 mL round-bottomed flask equipped with a magnetic stir bar and subjected to rotary evaporation to remove water. Then, 68.60 g 3-(triethoxysilyl)propylisocyanate were added to the flask, followed by approximately 3 milligrams DBTDL, and the mixture stirred. The reaction proceeded with a mild exotherm. The reaction was run for approximately 16 hours at which time IR Spectroscopy showed no isocyanate present. The remainder of the solvent was removed via rotary evaporation at 90° C. to yield 104.46 g PEG2TES as a somewhat viscous fluid.

A mixture of 450.00 g MOP, 15.64 g SILQUEST A174, 4.09 g PEG2TES, and 0.00782 g PROSTAB 5198 were added with stirring to a 1-quart jar containing 400.00 g NALCO 2327. The jar was then sealed and heated to 80° C. for 16.5 hours. This resulted in a clear blue, low viscosity solution of modified silica (SILICA-C).

Preparation of Coatable Solutions

A solution of 20 percent by weight of PMMA in toluene was prepared in a beaker to provide STOCK PMMA SOLUTION. To samples of this solution, the modified particles (SILICA-A or SILICA-B), 1-methoxy-2-propanol acetate (PM Acetate), and toluene were added in the amounts shown in the tables below. The PMMA concentration was maintained at 10 wt. % of the total weight of coatable solution. PM Acetate concentration listed in the tables is wt. % based on the total weight of solvent (i.e., PM Acetate plus toluene). Modified particle concentration is wt. % based on the total dry weight of polymer (PMMA).

Preparation of Coated Slides

Solutions were coated onto a 2 inch (5.1 cm) wide by 3 inch (7.6 cm) long glass slide (obtained from Corning, Inc., Corning, N.Y.). Using a micropipette (Eppendorf), 75 microliters of fluid were placed on the slide and allowed to flow out under gravity. The coated slide was placed directly on a hot plate set at a temperature of 250° F. +/−2° F. (121° C.) for about 2.5 minutes. The dried samples were then inspected visually and tested for surface topography according to Method I or Method II described hereinabove.

Examples 1–6 and Comparative Examples C1–C4

Ten solutions were prepared according to PREPARATION OF COATABLE SOLUTIONS above using varying amounts of PM Acetate and SILICA-B. Comparative Examples without PM Acetate or without SILICA-B were also prepared. The solutions were coated onto glass slides according to PREPARATION OF COATED SLIDES described above. The dried samples were tested for surface topography according to Method I. The amounts of PM Acetate and SILICA-B used, and the surface topography results are given in Table 3.

Examples 7–13 and Comparative Example C5

Eight solutions were prepared according to PREPARATION OF COATABLE SOLUTIONS above using varying amounts of PM Acetate and SILICA-A. A Comparative Example without PM Acetate was also prepared. The solutions were coated onto glass slides according to PREPARATION OF COATED SLIDES described above. The dried samples were tested for surface topography according to Method I. The amounts of PM Acetate and SILICA-A used, and the surface topography results are given in Table 3.

TABLE 3

| Sample I.D. | PMMA wt. % | Toluene wt. % | PM Acetate wt. % | Nanoparticles type | wt. % | Ra (nm) | Rq (nm) |
|---|---|---|---|---|---|---|---|
| 1 | 10 | 70 | 30 | SILICA-B | 5 | 261 | 371 |
| 2 | 10 | 60 | 40 | SILICA-B | 1 | 660 | 753 |
| 3 | 10 | 60 | 40 | SILICA-B | 5 | 726 | 868 |
| 4 | 10 | 60 | 40 | SILICA-B | 10 | 455 | 620 |
| 5 | 10 | 52 | 48 | SILICA-B | 5 | 841 | 1070 |
| 6 | 10 | 50 | 50 | SILICA-B | 1 | 404 | 487 |
| C1 | 10 | 100 | 0 | none | 0 | 1170 | 1470 |
| C2 | 10 | 70 | 30 | none | 0 | 1226 | 1690 |
| C3 | 10 | 60 | 40 | none | 0 | 612 | 741 |
| C4 | 10 | 100 | 0 | SILICA-B | 5 | 424 | 602 |
| 7 | 10 | 80 | 20 | SILICA-A | 5 | 120 | 177 |
| 8 | 10 | 70 | 30 | SILICA-A | 0.05 | 380 | 470 |

| Sample I.D. | PMMA | Toluene | PM Acetate | Nanoparticles | | Ra | Rq |
|---|---|---|---|---|---|---|---|
| 9 | 10 | 70 | 30 | SILICA-A | 1 | 470 | 617 |
| 10 | 10 | 70 | 30 | SILICA-A | 2 | 90 | 119 |
| 11 | 10 | 70 | 30 | SILICA-A | 5 | 457 | 604 |
| 12 | 10 | 70 | 30 | SILICA-A | 10 | 140 | 189 |
| 13 | 10 | 60 | 40 | SILICA-A | 5 | 174 | 223 |
| C5 | 10 | 100 | 0 | SILICA-A | 5 | 138 | 181 |

Figure 2:
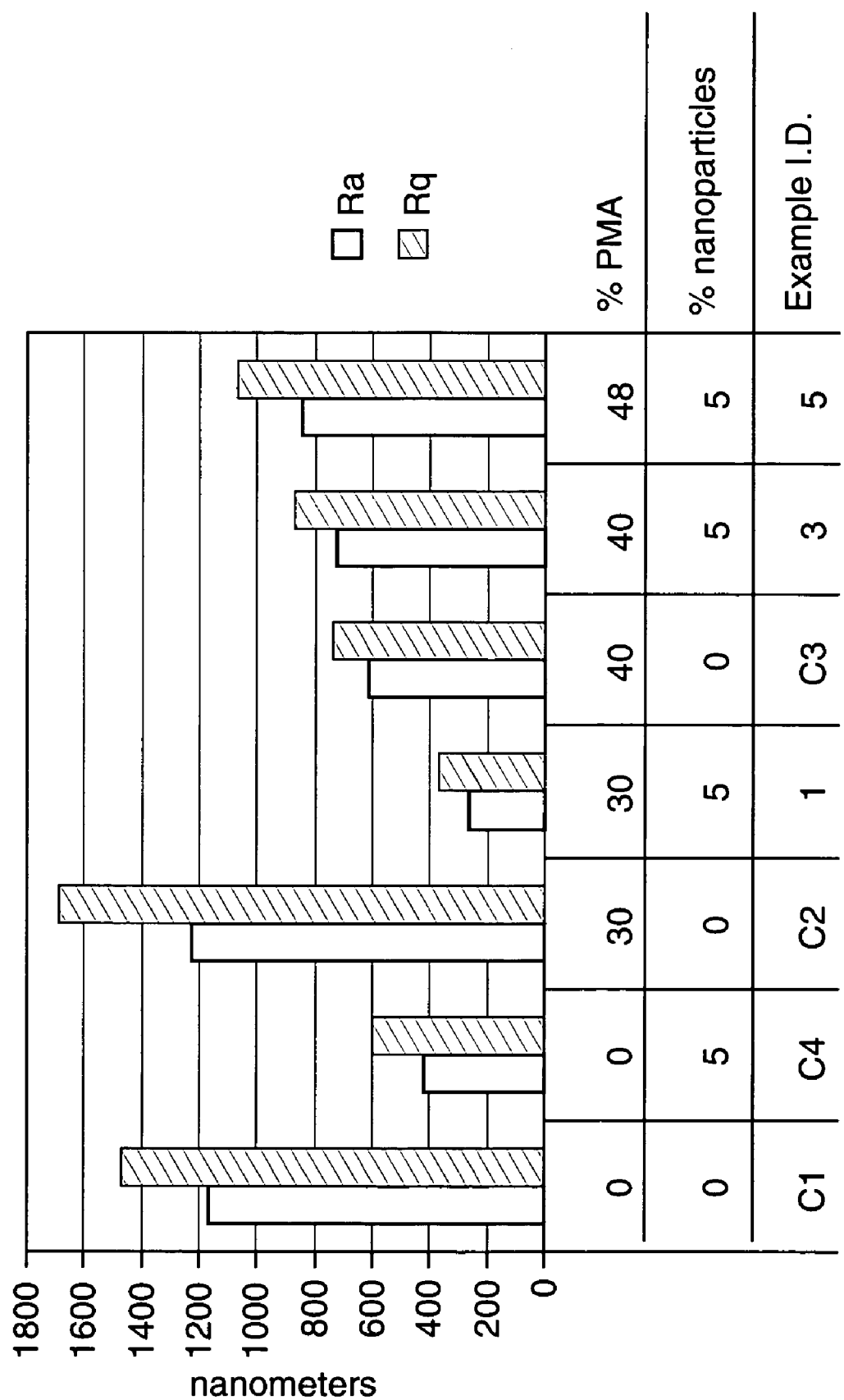
FIG. 2 is a plot of Ra and Rq values for Comparative Examples C1–C4 and Examples 1, 3, and 5.
Figure 3:
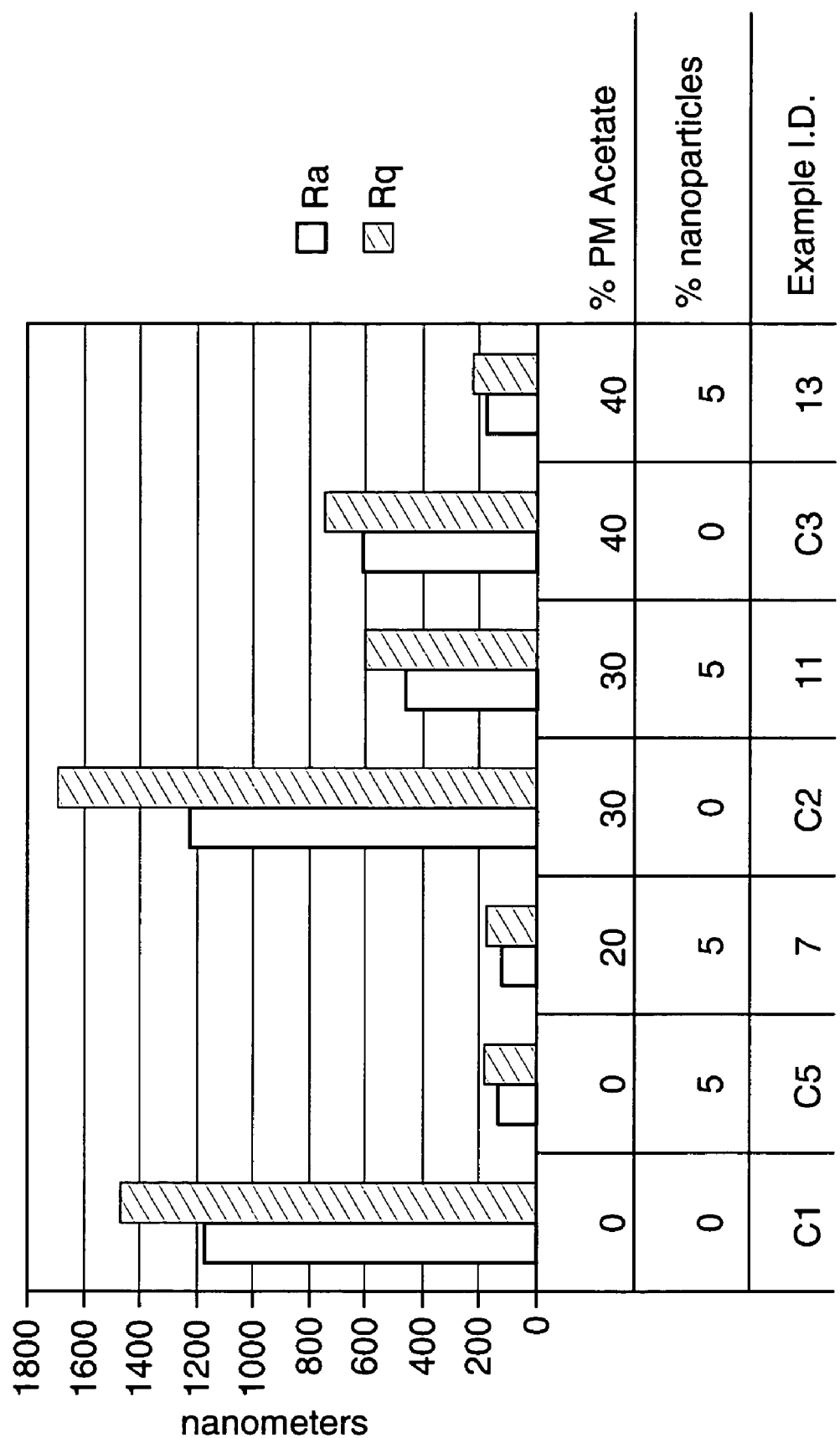
FIG. 3 is a plot of Ra and Rq values for Comparative Examples C1–C3 and C5, and Examples 7, 11, and 13.
Figure 4:
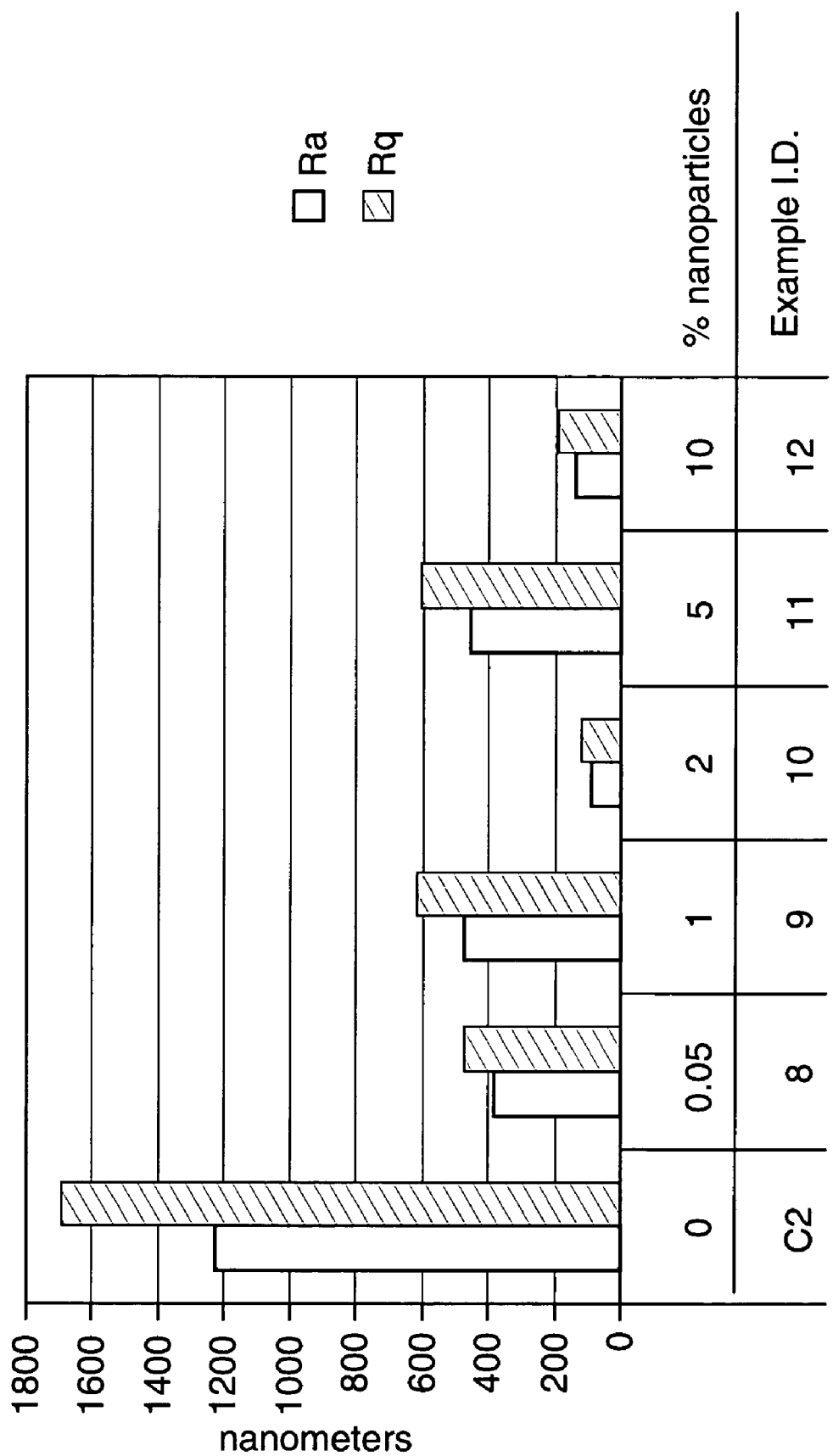
FIG. 4 is a plot of Ra and Rq values for Comparative Example C2 and Examples 8–12.

Ra and Rq values for Comparative Examples C1–C4 and Examples 1, 3, and 5 are shown in FIG. 2. Ra and Rq values for Comparative Examples C1–C3 and C5, and Examples 7, 11, and 13 are shown in FIG. 3. Ra and Rq values for Comparative Example C2 and Examples 8–12 are shown in FIG. 4.

Example 14 and Comparative Example C6

Two hundred grams of SILICA-C and 56.7 g HDDA were combined in a 1-liter round-bottom large neck flask. Solvent was removed via rotary evaporation. The resulting material was a high viscosity gel at room temperature. The SILICA-C/HDDA gel contained approximately 40 wt. % SILICA-C.

Five grams of SILICA-C/HDDA gel, prepared as described above, were added to a blend of 33.5 g HDDA and 61.5 g THF. To this mixture, 0.1 g DAROCUR 1173 was added. A Comparative Example without SILICA-C was also prepared. Each solution was coated onto a 2 inch (5.1 cm) wide by 3 inch (7.6 cm) long glass slide (available from Corning, Inc., Corning, N.Y.) using a micropipette (Eppendorf) set to deliver 75 microliters of fluid. The coated slide was then dried at room temperature. The dried sample was then cured in a Nitrogen atmosphere under a medium pressure mercury UV fusion lamp (obtained from Fusion UV Systems, Gaithersburg, Md.) having an average intensity of 1744 mW/cm$^2$ and with a total average energy of 486 mJ/cm$^2$. The cured samples were tested for surface topography according to Method II. Results are given in Table 4.

TABLE 4

| Example I.D. | Ra (nm) | Rq (nm) |
|---|---|---|
| 14 | 26 | 34 |
| C6 | 103 | 129 |

Example 15

Varying amounts of SILICA-A and a liquid (IOA, toluene, or PM acetate) were prepared by combining the components at room temperature to obtain a 20 g sample. The solution rheology of each sample was measured with a BOHLIN C-VOR Rheometer (obtained from Bohlin Instruments, Inc., East Brunswick, N.J.) using a C25 Couette geometry. Controlled stress sweeps were completed in a shear stress range of $1\times10^{-3}$ to $1\times10^{+3}$ at 25° C. The temperature was controlled using a PELTEER unit to within +/−0.2° C. A Newtonian model was fit to the measured data and the viscosity recorded. The compositions of the solutions and the viscosity results are provided in Table 5 and are shown graphically in FIG. 5.

TABLE 5

| Example I.D. | SILICA-A wt. % | Solvent | Viscosity mPa · s |
|---|---|---|---|
| 15A | 1 | toluene | 1 |
| 15B | 1 | IOA | 2.4 |
| 15C | 1 | PM acetate | 1.8 |
| 15D | 2 | toluene | 1 |
| 15E | 2 | IOA | 2.5 |
| 15F | 5 | toluene | 1.1 |
| 15G | 5 | IOA | 2.6 |
| 15H | 5 | PM acetate | 2.1 |
| 15I | 7 | toluene | 1.1 |
| 15J | 7 | IOA | 2.8 |
| 15K | 10 | toluene | 1.3 |
| 15L | 10 | IOA | 3 |
| 15M | 17 | toluene | 1.6 |
| 15N | 17 | IOA | 3.9 |
| 15O | 17 | PM acetate | 17.3 |
| 15P | 25 | toluene | 2.4 |
| 15Q | 25 | IOA | 6.4 |
| 15R | 33 | toluene | 4.2 |
| 15S | 33 | IOA | 14.4 |
| 15T | 41 | toluene | 11.8 |
| 15U | 41 | IOA | 58.9 |
| 15V | 50 | toluene | 77.3 |
| 15W | 50 | IOA | 611.7 |

Example 16

Figure 6:
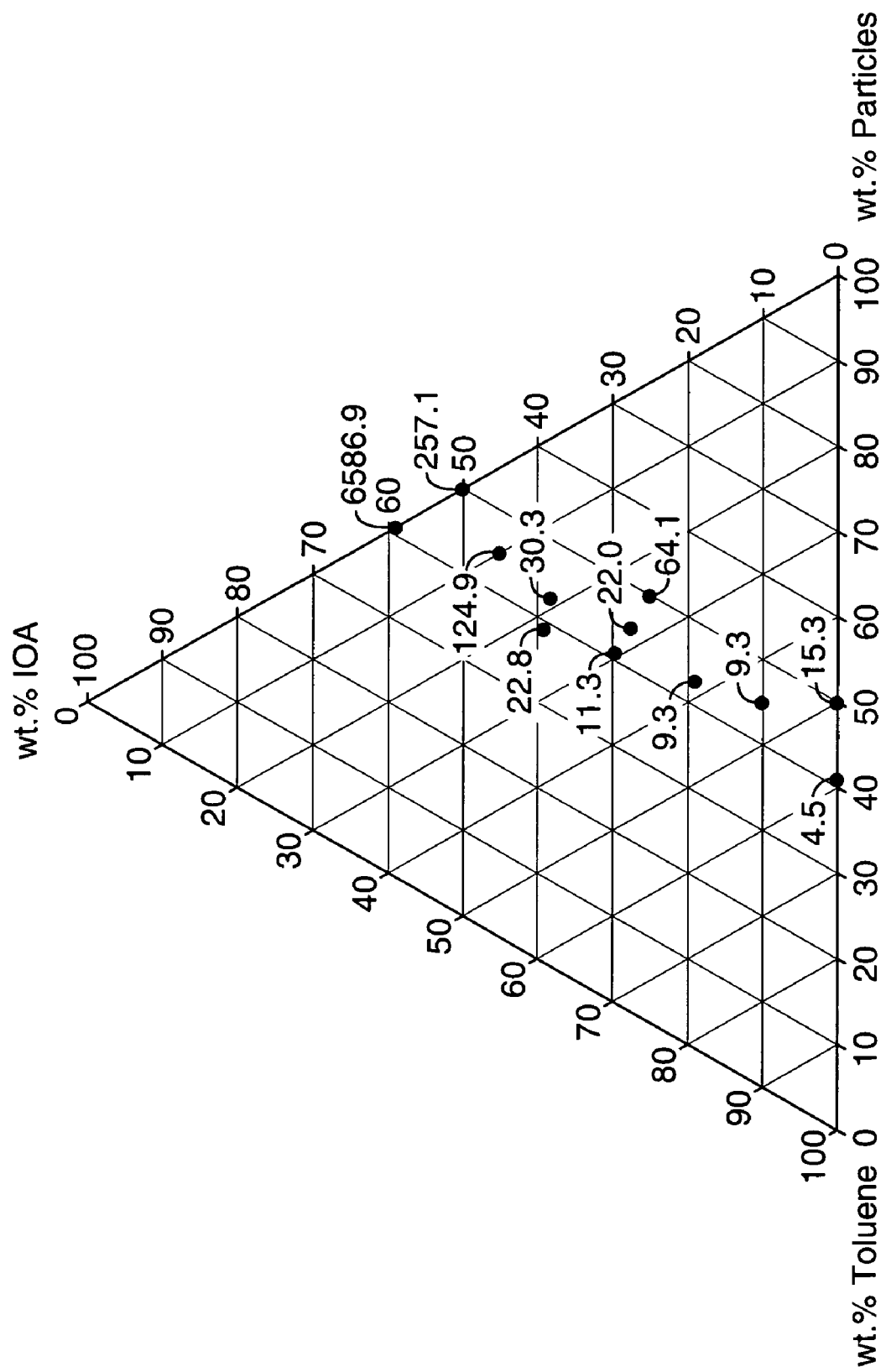
FIG. 6 is a ternary plot of solution viscosity versus weight percent of nanoparticles, toluene, and IOA.

A ternary plot of viscosity versus composition for varying amounts of IOA, toluene, and SILICA-B was generated. Solution rheology was measured with a BOHLIN C-VOR Rheometer (obtained from Bohlin Instruments, East Brunswick, N.J.) using a C25 Couette geometry. Controlled stress sweeps were completed in a shear stress range of $1\times10^{-3}$ to $1\times10^{+3}$ at 25° C. The temperature was controlled using a PELTIER unit to within +/−0.2° C. A Newtonian model was fit to the measured data and the viscosity recorded. The compositions of the solutions and the viscosity results are provided in Table 6 and are shown graphically in FIG. 6.

TABLE 6

| Example I.D. | IOA wt. % | Toluene wt. % | SILICA-B wt. % | Viscosity mPa · s |
|---|---|---|---|---|
| 16A | 39 | 22 | 39 | 23 |
| 16B | 45 | 10 | 45 | 125 |
| 16C | 30 | 29 | 41 | 11 |
| 16D | 10 | 45 | 45 | 9 |
| 16E | 27 | 28 | 45 | 22 |
| 16F | 25 | 25 | 50 | 64 |
| 16G | 19 | 38 | 43 | 9 |
| 16H | 38 | 19 | 43 | 30 |
| 16I | 50 | 0 | 50 | 6587 |
| 16J | 59 | 0 | 41 | 257 |
| 16K | 0 | 50 | 50 | 15 |
| 16L | 0 | 59 | 41 | 5 |

Various modifications and alterations of this invention will become apparent to those skilled in the art without departing from the scope and spirit of this invention.

What is claimed is:

1. A coating solution comprising:
   (a) a first liquid having a vapor pressure, VP1;
   (b) a second liquid miscible with the first liquid, having a vapor pressure, VP2, that is less than VP1; and
   (c) surface modified nanoparticles dispersed in the first liquid and the second liquid,
wherein the nanoparticles are more compatible with the first liquid.

2. The coating solution of claim 1, wherein the second liquid is curable.

3. The coating solution of claim 2, wherein the second liquid is curable by heat, actinic radiation, electron beam radiation, moisture, or combinations thereof.

4. The coating solution of claim 1, further comprising a crosslinker.

5. The coating solution of claim 1, wherein the second liquid is selected from the group consisting of: acrylates, methacrylates, epoxies, polyesters, polyols, isocyanates, polystyrene, polyacrylates, polymethacrylates, polyurethanes, and combinations thereof.

6. The coating solution of claim 1, wherein the first liquid is selected from the group consisting of: water, organic solvents, inorganic solvents, and combinations thereof.

7. The coating solution of claim 6, wherein the organic solvent is selected from the group consisting of: alcohols, ketones, aromatic hydrocarbons, and combinations thereof.

8. The coating solution of claim 1, wherein the second liquid is selected from the group consisting of: water, organic solvents, inorganic solvents, and combinations thereof.

9. The coating solution of claim 8, wherein the second liquid is 1-methoxy-2-propanol acetate.

10. The coating solution of claim 1, further comprising a material selected from the group consisting of dyes, pigments, fillers, electrically conductive particles, thermally conductive particles, fibers, film-forming polymers, catalysts, initiators, and combinations thereof.

11. The coating solution of claim 10, wherein the film-forming polymer is polymethylmethacrylate.

12. The coating solution of claim 1, wherein the second liquid is an acrylate, optionally wherein the acrylate is selected from the group consisting of isooctyl acrylate, 2-ethylhexyl acrylate, 1,6-hexanediol diacrylate, and combinations thereof.

13. A method of enhancing coating uniformity comprising:
   (a) applying the coating solution of claim 1 to a surface of a substrate;
   (b) removing at least a portion of the first liquid, optionally wherein removing comprises evaporation, and optionally wherein removing at least a portion of the first liquid comprises removing substantially all of the first liquid.

14. The method of claim 13, further comprising:
   (c) removing at least a portion of the second liquid, optionally wherein removing comprises evaporation, and optionally wherein removing at least a portion of the second liquid comprises removing substantially all of the second liquid.

15. The method of claim 13, further comprising curing and/or crosslinking the second liquid.

16. A coated substrate made by the method of claim 13.

17. The coated substrate of claim 16, wherein the substrate is selected from the group consisting of: glass, metal, polymer, wood, ceramic, paper, fabric, and combinations thereof.

18. A coated substrate made by the method of claim 14.

19. The coated substrate of claim 18, wherein the substrate is selected from the group consisting of: glass, metal, polymer, wood, ceramic, paper, fabric, and combinations thereof.

20. A coated substrate made by the method of claim 15.

21. The coated substrate of claim 20, wherein the substrate is selected from the group consisting of: glass, metal, polymer, wood, ceramic, paper, fabric, and combinations thereof.

* * * * *

UNITED STATES PATENT AND TRADEMARK OFFICE
CERTIFICATE OF CORRECTION

PATENT NO. : 7,189,768 B2  Page 1 of 1
APPLICATION NO. : 10/722177
DATED : March 13, 2007
INVENTOR(S) : Jimmie R. Baran, Jr.

It is certified that error appears in the above-identified patent and that said Letters Patent is hereby corrected as shown below:

On the Title Page Item -56- under (Other Publications)
Line 6, delete "10/499,677," and insert -- 10/449,677, --, therefor.

Column 10
Line 67, delete "(nm—" and insert -- (nm) --, therefor.

Column 14
Line 32, delete "PELTEER" and insert -- PELTIER --, therefor.

Column 15
Line 37, in Claim 1, delete "liquid." and insert -- than with the second liquid. --, therefor.

Signed and Sealed this

Twentieth Day of May, 2008

JON W. DUDAS
*Director of the United States Patent and Trademark Office*